United States Patent
Ito (10) Patent No.: US 7,336,976 B2
(45) Date of Patent: Feb. 26, 2008

(54) MOBILE TELEPHONE DEVICE

(75) Inventor: Tsurumi Ito, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 83 days.

(21) Appl. No.: 10/578,882

(22) PCT Filed: Nov. 4, 2004

(86) PCT No.: PCT/JP2004/016306

§ 371 (c)(1),
(2), (4) Date: May 11, 2006

(87) PCT Pub. No.: WO2005/048573

PCT Pub. Date: May 26, 2005

(65) Prior Publication Data

US 2007/0042813 A1    Feb. 22, 2007

(30) Foreign Application Priority Data

Nov. 14, 2003   (JP)   ............................. 2003-385135

(51) Int. Cl.
*H04B 1/38* (2006.01)
(52) U.S. Cl. ..................... 455/566; 455/573
(58) Field of Classification Search .............. 455/566, 455/572, 573, 574, 343.1, 556.1, 556.2; 340/7.55; 348/14.03, 14.07
See application file for complete search history.

(56) References Cited

U.S. PATENT DOCUMENTS 6,131,046 A * 10/2000 Sano et al. .................. 455/566

FOREIGN PATENT DOCUMENTS

| JP | 11-184576 | 7/1999 |
|---|---|---|
| JP | 2000-308269 | 11/2000 |
| JP | 2002-318134 | 10/2002 |

OTHER PUBLICATIONS

International Search Report mailed Dec. 7, 2004 of International Application PCT/JP2004/016306.
English translation of the International Preliminary Report on Patentability (form PCT/IB/338) of International Application No. PCT/JP2004/016306, Dec. 7, 2004.

* cited by examiner

*Primary Examiner*—Lee Nguyen
(74) *Attorney, Agent, or Firm*—Westerman, Hattori, Daniels & Adrian, LLP.

(57) ABSTRACT

A mobile telephone device (30) includes the TV viewing function as an additional function. A battery (7) supplies power to each circuit of the mobile telephone device (30). The battery (7) can cut off power supply to a tuner (4) by control of a base band chip (3). A battery remaining capacity monitoring device (11) outputs data indicating the battery remaining capacity. The base band chip (3) reads the data outputted from the battery remaining capacity monitoring device (11) so as to acquire the remaining capacity of the battery (7). When the remaining capacity of the battery (7) is found to be lower than a predetermined value, execution of the TV viewing function is disabled (power supply to the tuner (4) is cut off) and a menu and icons are displayed differently on a display device (6).

7 Claims, 10 Drawing Sheets

MOBILE TELEPHONE DEVICE

FIELD OF THE INVENTION

The present invention relates to a mobile telephone device provided with an additional function including a television-viewing function, or the like.

BACKGROUND ART

For mobile telephones provided with a TV (television)-viewing function, electric power consumption generally increases during viewing television than during waiting a call, calling, or sending and receiving electronic mail. Continuing to view television leads to a battery drain, and finally to an inoperative state of the mobile telephone. That is, it becomes impossible to perform the original functions of the mobile telephone such as call-waiting, calling, or sending and receiving electronic mail because of the TV-viewing as an additional function. Therefore, in order to solve such a disadvantage, there is proposed a terminal in which TV-viewing is disabled when a battery remaining amount falls below a certain level (See Japanese Patent Laying-open No.H11-184576).

DISCLOSURE OF THE INVENTION

Problems to be Solved by the Invention

However, in the above-described conventional terminals, even when battery remaining amount falls below a certain level, a display mode of a menu and an icon for starting a TV-viewing function is the same as that in a normal state. Therefore, there is a disadvantage that a user cannot determine whether or not TV-viewing is possible until the user actually start the TV-viewing function.

In view of the above circumstance, an object of the present invention is to provide a mobile telephone device capable of allowing a user to realize in advance that an additional function is in a restricted state when a process for restricting the additional function is performed due to a falling of battery remaining amount below a certain level.

MEANS TO SOLVE THE PROBLEMS

In order to solve the above problem, a mobile telephone device according to the present invention is a mobile telephone device provided with an additional function, which comprises means for monitoring a battery remaining amount and disabling all of or a part of the additional function upon falling of the battery remaining amount below a certain value; and means for changing display modes of a menu for activating the additional function depending on whether the additional function is in a disabled state or in a permitted state.

With the above configuration, when a process for restricting the additional function is performed due to falling of a battery remaining amount below a certain level, it is possible to allow a user to realize in advance that the additional function is in the restricted state by changing display modes of the menu.

It is preferable that a cursor moving on items on the menu skips an item of a disabled additional function when the additional function is in the disabled state. Or, it is preferable that the item of the disabled additional function is not displayed or displayed in pale color when the additional function is in the disabled state.

In addition, a mobile telephone device according to the present invention is a mobile telephone device provided with an additional function, which comprises a display portion for displaying an icon representing presence of the additional function or a state of the additional function; means for monitoring a battery remaining amount and disabling all or a part of the additional function upon falling of the battery remaining amount below a certain value; and means for changing display modes of the icon depending on whether the additional function is in a disabled state or in a permitted state. According to also such the configuration, when a process for restricting the additional function is performed due to a falling of battery remaining amount below a certain level, it is possible to allow a user to realize in advance that the additional function is in the restricted state by changing display modes of the icon. A mobile telephone device may comprise a broadcast receiving and viewing function as the additional function, wherein an icon representing broadcast reception sensitivity is displayed as the icon, and display modes of the icon are changed depending on whether a broadcast receiving and viewing function is in a disabled state or in a permitted state.

The mobile telephone device according to such the configurations may be configured such that the battery remaining amount is monitored even while the additional function being executed, and the additional function under execution is forcibly terminated upon falling of the battery remaining amount below the certain value.

EFFECTS OF THE INVENTION

With the present invention, when a process for restricting the additional function is performed due to a falling of battery remaining amount below a certain level, there is an advantage of enabling a user to realize in advance that the additional function is in the restricted state by changing display modes of the menu or the icon.

DESCRIPTION OF THE NUMERALS 3 baseband chip (BB)
4 tuner
5 application processor (APP)
6 display
7 battery
8 battery remaining amount monitor

BEST MODE FOR CARRYING OUT THE INVENTION

Hereinafter, an embodiment of the present invention will be described with reference to FIGS. 1 to 10.

Figure 1:
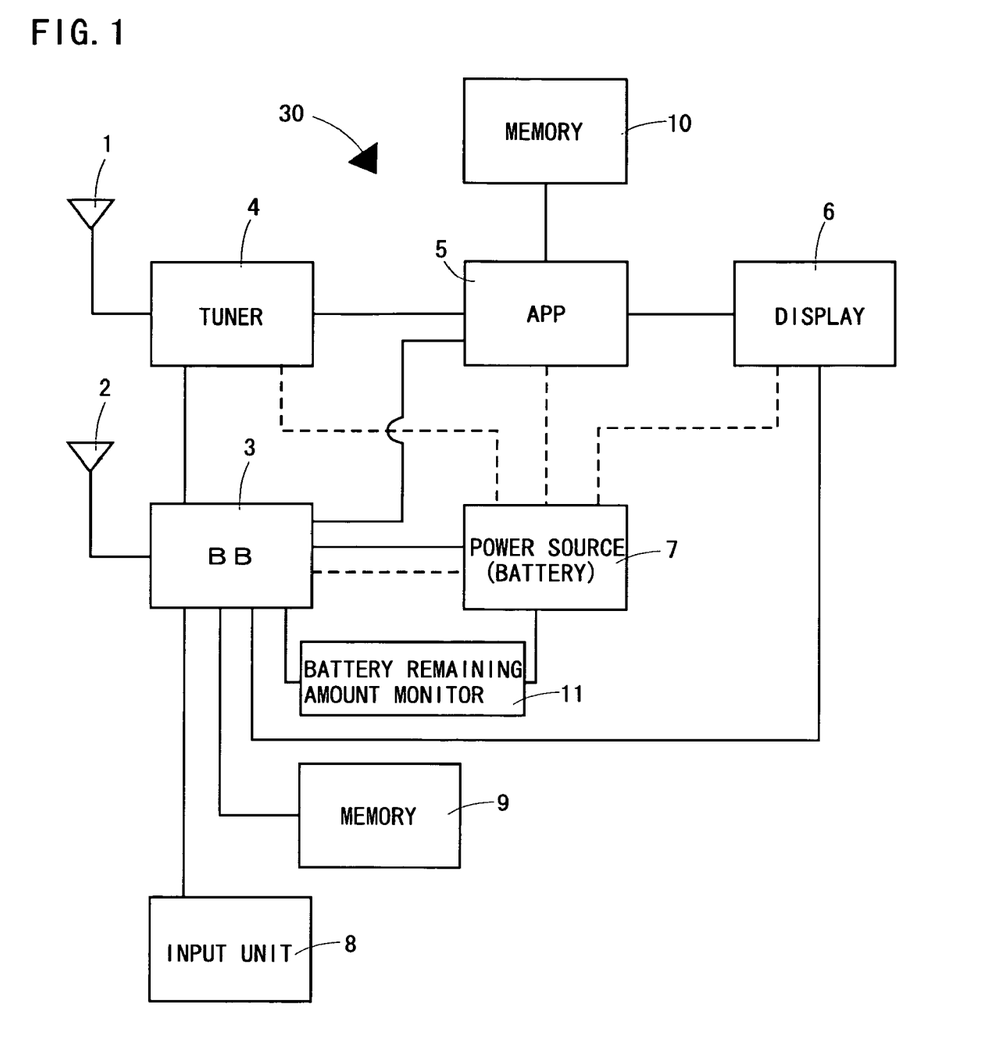
FIG. 1 is a block diagram showing a configuration of a mobile telephone device according to an embodiment of the present invention.

FIG. 1 is a constructional view showing a mobile telephone device 30 with a broadcast receiving function according to the present invention. A numeral 1 indicates an antenna for receiving a television broadcast wave, and a numeral 2 indicates an antenna for sending and receiving a mobile telephone radio wave. In some configurations, it is possible that one of the antennas 1 and 2 receives both of the radio waves.

A tuner module 4 performs a process for receiving a digital television broadcast wave and demodulating the modulated wave, for example. An application processor (APP) 5 performs various kinds of processes including videophone communication, electronic mail transmission and reception, Internet website browsing, digital television reception, etc. This application processor 5 is a processor for executing a function for receiving demodulated data from the tuner module 4 to generate a video and audio, a function for recording on/reproducing from a recording medium, and other functions necessary for an operation of a digital television, and is composed of an LSI (large-scale integrated circuit) in which a CPU required for various kinds of processes for executing these functions, a process circuit for decoding video data such as MPEG4, etc., and audio data such as AAC, etc., are combined.

A baseband chip (BB) 3 is a chip for performing controls of outgoing and incoming calls, telephone call, network connection, etc., on the mobile telephone, and is composed of an LSI in which a CPU and various kinds of circuits for performing processes necessary for a mobile telephone such as modulation and demodulation, signal process, and call process are combined.

A memory 9 is connected to the baseband chip 3, and a memory 10 is connected to the application processor 5. Each of the memories 9, 10 is composed of a flash memory for storing a program and setting data, and a work DRAM. A display 6 is connected to the baseband chip 3 and the application processor 5, and displays process results of the baseband chip and the application processor. An input unit 8 is provided with various keys described later and is connected to the baseband chip 3.

A battery 7 supplies power to each circuit of the mobile telephone device 30. The battery 7 can shut off the power supply to the tuner module 4 by control of the baseband chip 3. It should be noted that the power supply to the application processor 5 may be shut off instead of shutting off the power supply to the tuner module 4. A battery remaining amount monitor 11 outputs data indicating a battery remaining amount. The baseband chip 3 acquires the remaining amount of the battery 7 by reading the data output from the battery remaining amount monitor 11.

Figure 2:
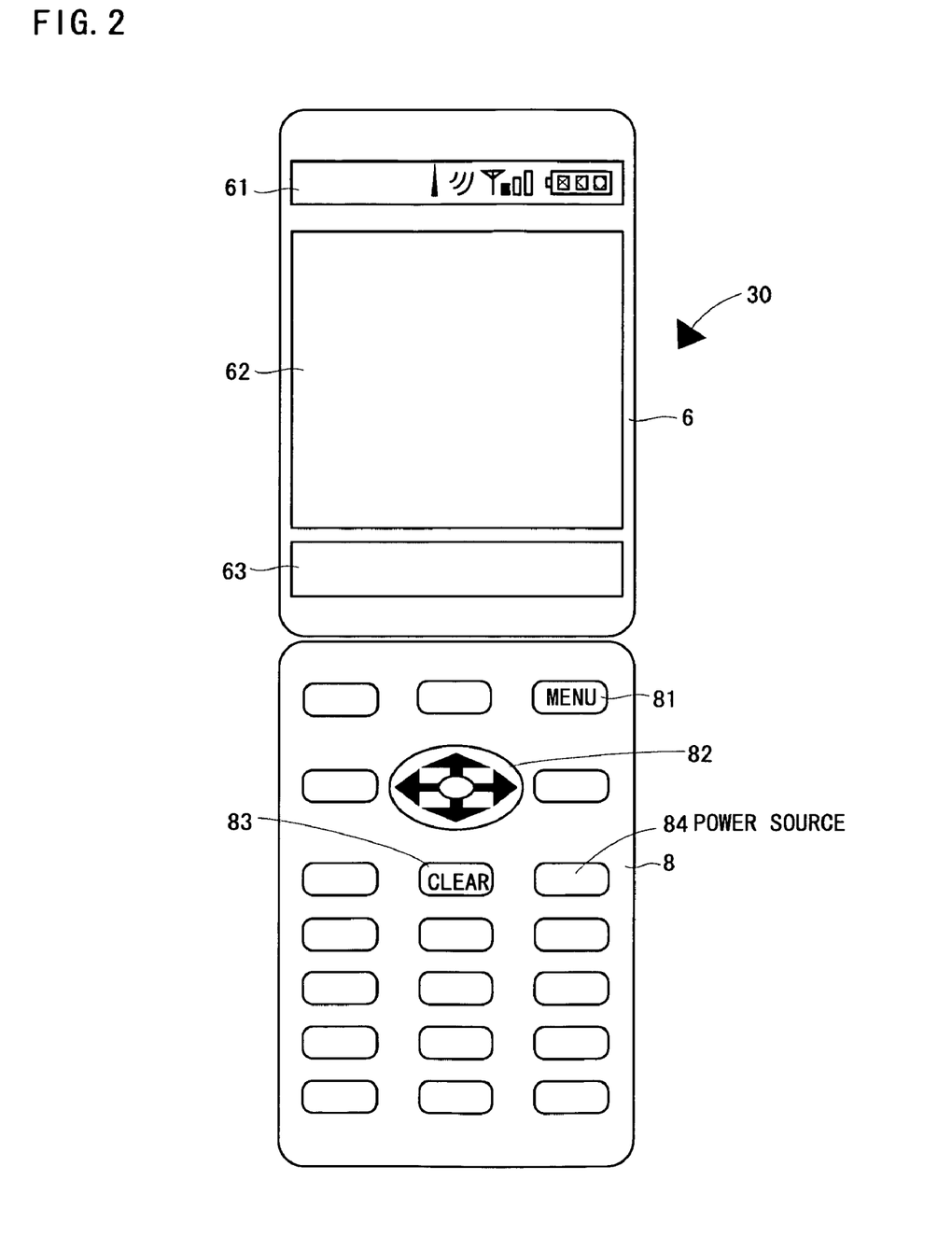
FIG. 2 is a descriptive diagram showing an appearance of a mobile telephone device according to an embodiment of the present invention.

FIG. 2 is a descriptive diagram showing display areas of the display 6 and the key arrangement of the input unit 8. An area 61 is a status display area for displaying statuses of instruments, such as antenna sensitivity and the like. An area 62 is an area for displaying process results of the baseband chip 3 and the application processor 4 (a received broadcast video screen, an electronic mail screen, a menu screen, and the like.) An area 63 is a status display area for displaying statuses of the device, and the like. The input unit 8 includes a menu key 81, a cross key (with an OK key) 82, a clear (CLR) key 83, a power source key 84, and the like. Depressing key portions representing left, right, up, and down directions on the cross key (with the OK key) 82 makes it possible to move a cursor in left, right, up, or down direction respectively, and depressing a central portion straight down makes the key function as the OK key.

FIGS. 3A to 3D are diagrams each showing the display state of the status display area 61. Three icons are displayed on the area 61, that is, an icon 613 indicating a reception level of the television radio wave, an icon 612 indicating a reception level of the mobile telephone radio wave, and an icon 611 indicating the battery remaining amount. The respective icons indicate the reception level of the radio waves and the battery remaining amount at three levels. The icon 613 indicating the reception level of the television radio wave represents the state of radio wave with three circular arcs. Three circular arcs indicate the strongest state of the radio wave (see FIG. 3A), two circular arcs indicate middle state (see FIG. 3B), and one circular arc indicates the weakest state. Moreover, "x" is displayed when the radio wave cannot be received at all (see FIG. 3C). In addition, when television-viewing is impossible due to a shortage of battery remaining amount, a TV-viewing impossible state due to the shortage of battery remaining amount is indicated by displaying under the "x" a battery icon drawn with three outlined rectangular portions.

In a case of the icon 612 for the mobile telephone, strength of the radio wave is shown by painting out three rectangular portions having different sizes. In a case of the icon 611 for the battery remaining amount, a large amount of remaining amount is indicated by painting out the three rectangular portions in the picture of the battery.

Figure 3A:
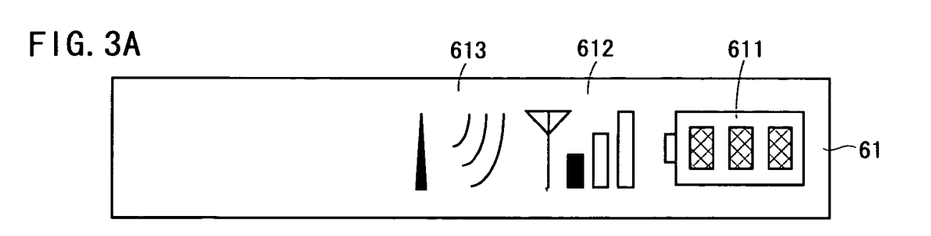
FIGS. 3A to 3D are descriptive diagrams showing examples of change in display of icons.
Figure 3B:
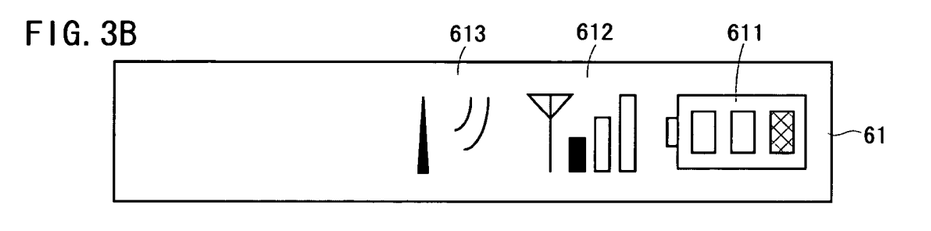
Figure 3C:
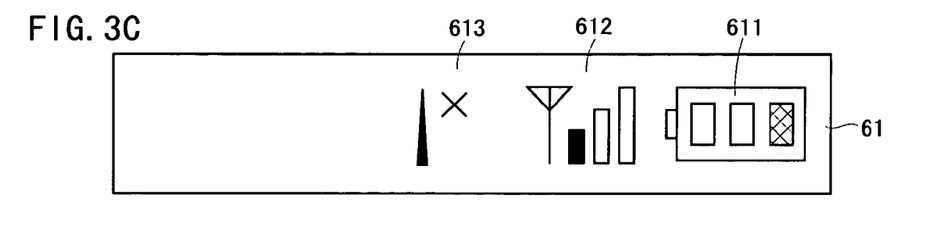
Figure 3D:
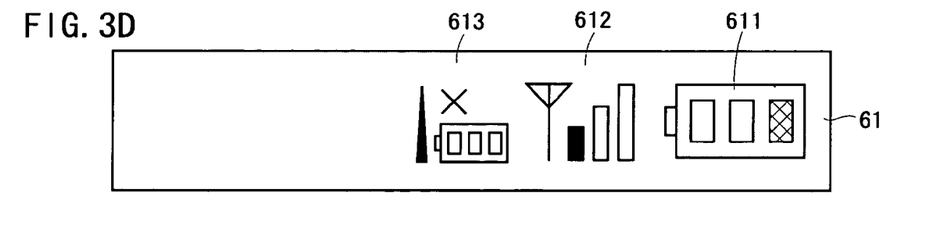
Figure 4A:
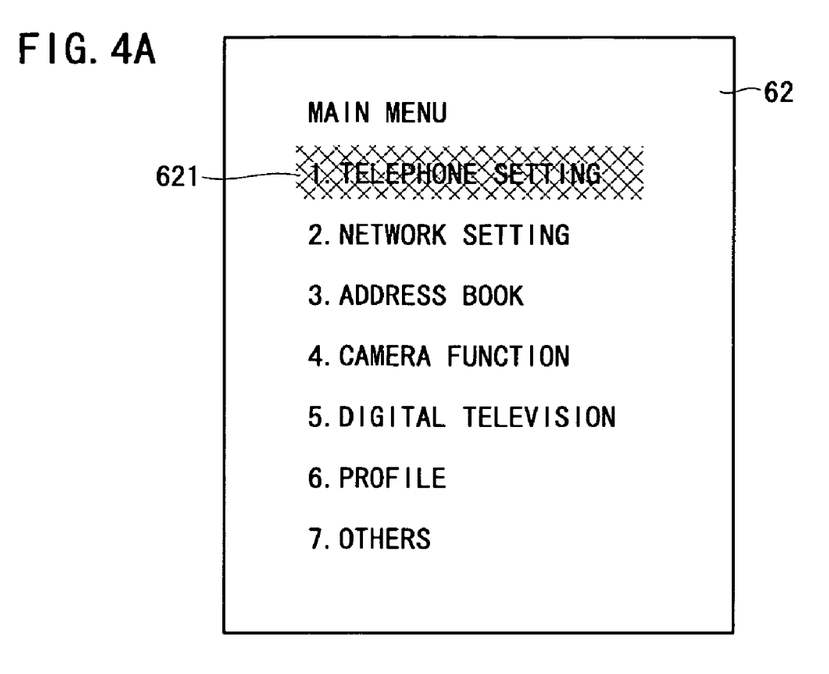
FIGS. 4A and 4B are descriptive diagrams showing examples of change in display of a menu.
Figure 4B:
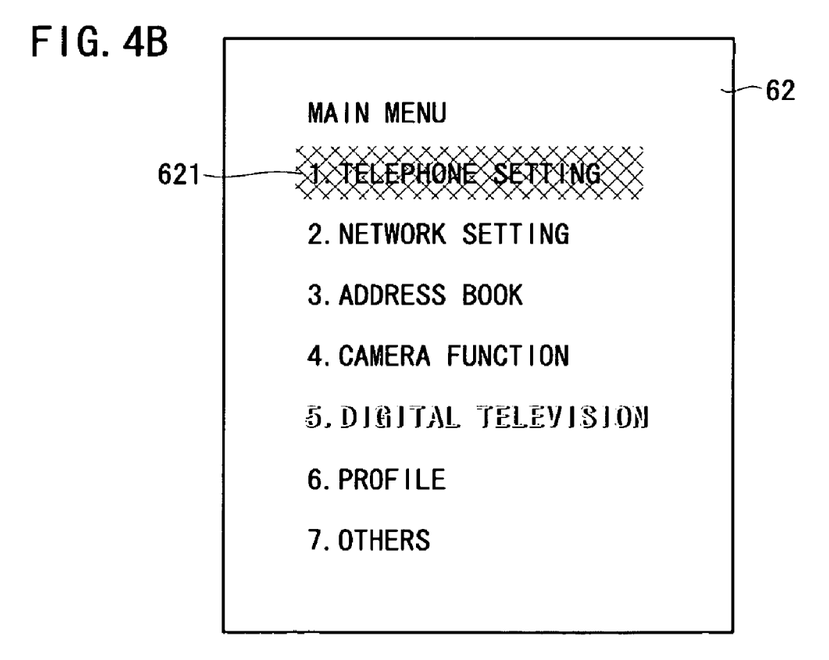

FIGS. 4A and 4B are descriptive diagrams showing the state in which a cursor 621 is displayed on the main menu on the area 62. For example, when the main menu is displayed by operating the "menu" key from a standby screen, the cursor is placed on the top menu item "1. telephone setting", as shown in FIG. 4A. Furthermore, FIG. 4A assumes a television-viewing possible state regarding the battery remaining amount, and the item "5. digital television" is displayed normally. Then, operating the cross key 82 can cause the cursor 621 to move onto the item "5. digital television". On the other hand, FIG. 4B assumes a television-viewing impossible state regarding the battery remaining amount, and the item "5. digital television" is displayed in gray color (displayed in pale color). It should be noted that the item may not be displayed. This notifies the user of the television-viewing impossible state due to a shortage of battery remaining amount. In addition, a process for not displaying the cursor 621 (for making the cursor skip) on the item "5. digital television" is performed. Moreover, at this time, the icons shown in the above-described FIG. 3D are displayed on the area 61.

Next, a description will be made about the operation in which the mobile telephone device 30 determines a permission or prohibition of the television-viewing operation while regularly checking the battery remaining amount, and changes the displays of the menu and icons, with reference to FIG. 5 through the flowchart in FIG. 10. Such the operation is performed by the CPU of the baseband chip 3 according to the program stored in the memory 9.

Figure 5:
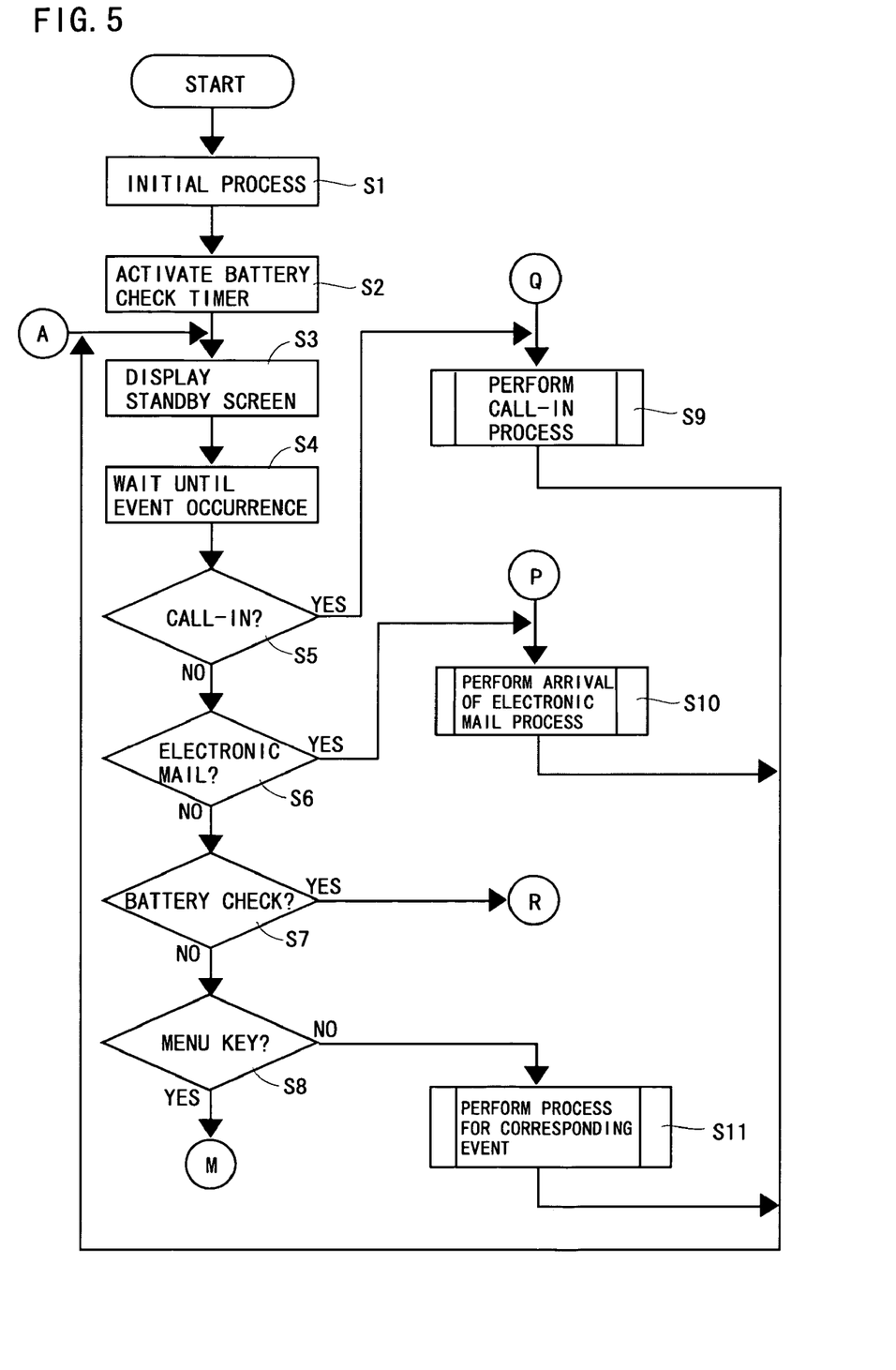
FIG. 5 is a flowchart showing a process content.

FIG. 5 shows a process in the CPU of the baseband chip 3 from the start. At first, an initial process is performed (step S1). The initial process includes clearing of a memory, initializations of an input unit and a display, and the like. After the initializations end, a battery check timer is activated (step S2). This timer is a program which generates events at regular time intervals. The timer is programmed as a task separated from the main process, and specifies a timing at which the main process checks the battery remaining amount.

Then, the standby screen is displayed (step S3), and some sort of event is waited to occur (step S4). The event includes key input, call-in, arrival of electronic mail, a battery check by the timer, and the like. When an event occurs, the process is determined depending on the sort of the event. The CPU judges whether or not the event is call-in (step S5), if the event is call-in, a call-in process is performed (step S9), then the process returns to the step S3 and the standby screen is displayed.

At the step S5, in a case where the CPU judges that the event is not call-in, the CPU judges whether or not the event is arrival of electronic mail (step S6). When the event is arrival of electronic mail, a process for arrival of electronic mail is performed (step S10), then the process returns to the step S3 and the standby screen is displayed again.

At the step S6, in a case where the CPU judges that the event is not arrival of electronic mail, the CPU judges whether or not the event is a battery check (step S7). If the event is a battery check, the process proceeds to step S81 (see FIG. 10). If the event is not a battery check, it is judged whether or not the menu key 81 has been depressed (step S8). When the CPU judges that the event is depression of the menu key 81, the process proceeds to step S21 (see FIG. 6). When the CPU judges that the event is not the depression of the menu key, a process corresponding to another event is performed (step S11), then the process returns to the step S3 and the standby screen is displayed.

Figure 6:
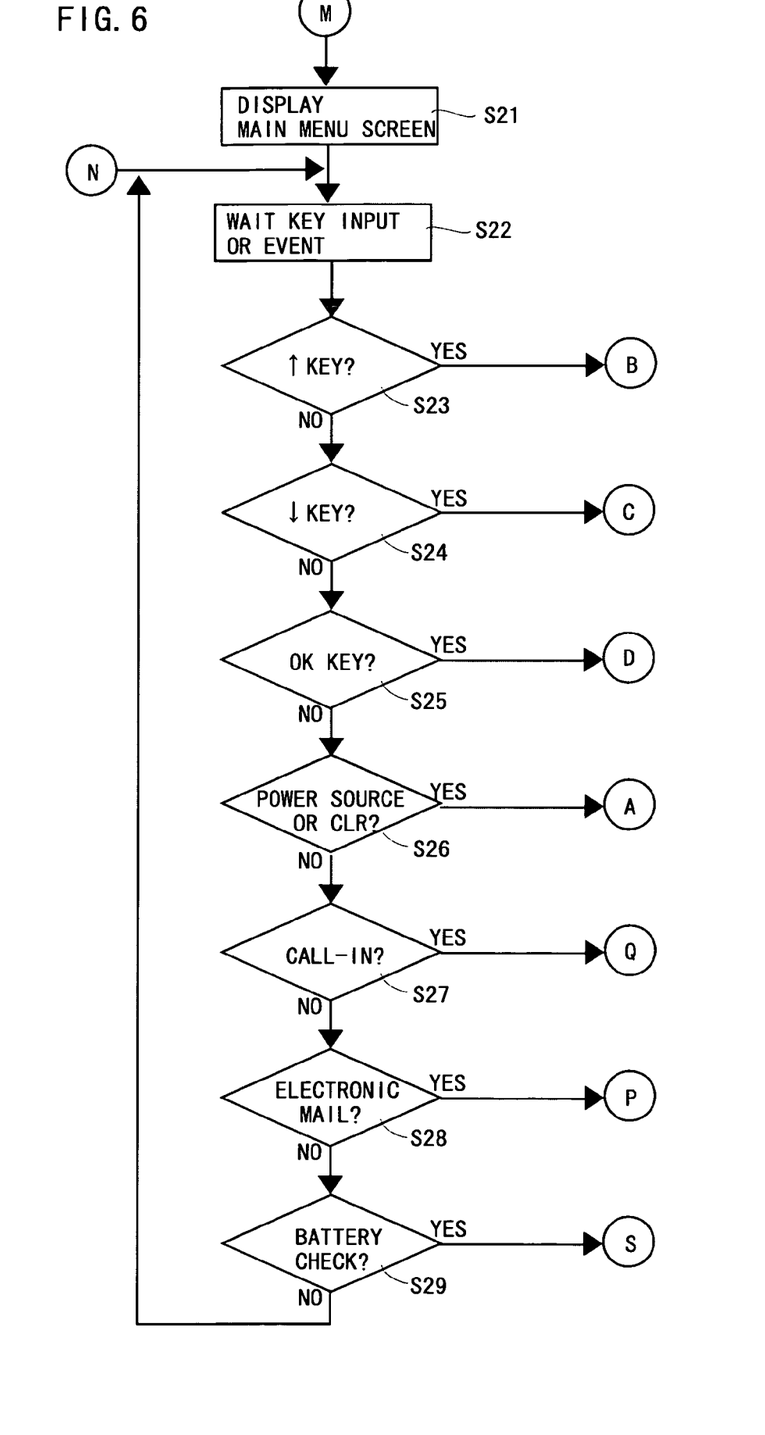
FIG. 6 is a flowchart showing a process content.
Figure 7:
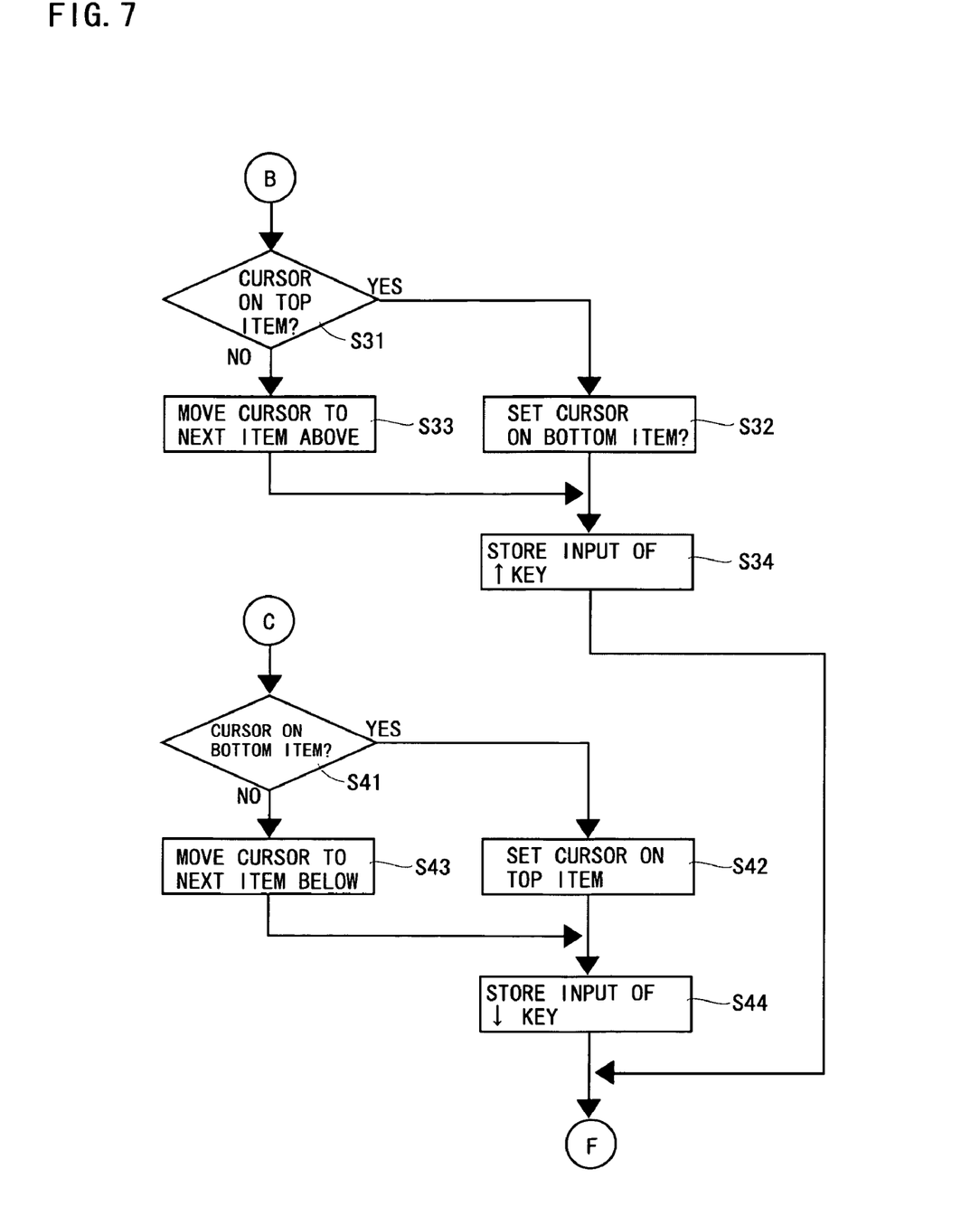
FIG. 7 is a flowchart showing a process content.

When the menu key 81 is depressed (YES at the step S8), the main menu is displayed on the display 6 as shown in FIG. 4 (step S21: see FIG. 6). At this time, the cursor 621 is positioned on the first item of the menu ("1. telephone setting" in this example). Then, key input and occurrence of another event are waited (step S22). When an event occurs, the sort of the event is determined at the next step.

At first, it is judged whether or not the operated key is an upper direction cursor-moving key (UP key) (step S23). The upper direction cursor-moving key indicates a key code which occurs when the upper end of the cross key 82 is depressed. When the operated key is the upper direction cursor-moving key, it is judged whether or not the cursor is positioned on the top of the menu (step S31: see FIG. 7). If the cursor is positioned on the top item of the menu, the cursor is set on the bottom item of the menu (step S32). In the example of the main menu in FIG. 4, the cursor is set on the item "7. others". When it is judged that the cursor is not positioned on the top of the menu (NO at the step S31), the cursor is moved onto the next item above (step S33). Then, after the input of the upper direction cursor-moving key is stored (step S34), the process proceeds to step S51 (see FIG. 8).

At the step S23, in a case that it is judged that the operated key is not the upper direction cursor-moving key, it is judged whether or not the operated key is lower direction cursor-moving key (DOWN key)(step S24). The lower direction cursor-moving key indicates a key code which occurs when the lower end of the cross key 82 is depressed. When the operated key is the lower direction cursor-moving key, it is judged whether or not the present position of the cursor is at the bottom of the menu (step S41: see FIG. 7). If the cursor is positioned on the bottom item of the menu, the cursor is set on the top item of the menu (step S42). In the example of the main menu in FIG. 4, the cursor is set on the item "1. telephone setting". When it is judged that the cursor is not positioned on the bottom item of the menu (NO at the step S41), the cursor is moved onto the next item below (step S43). Then, after the input of the lower direction cursor-moving key is stored (step S44), the process proceeds to step S51 (see FIG. 8).

Figure 8:
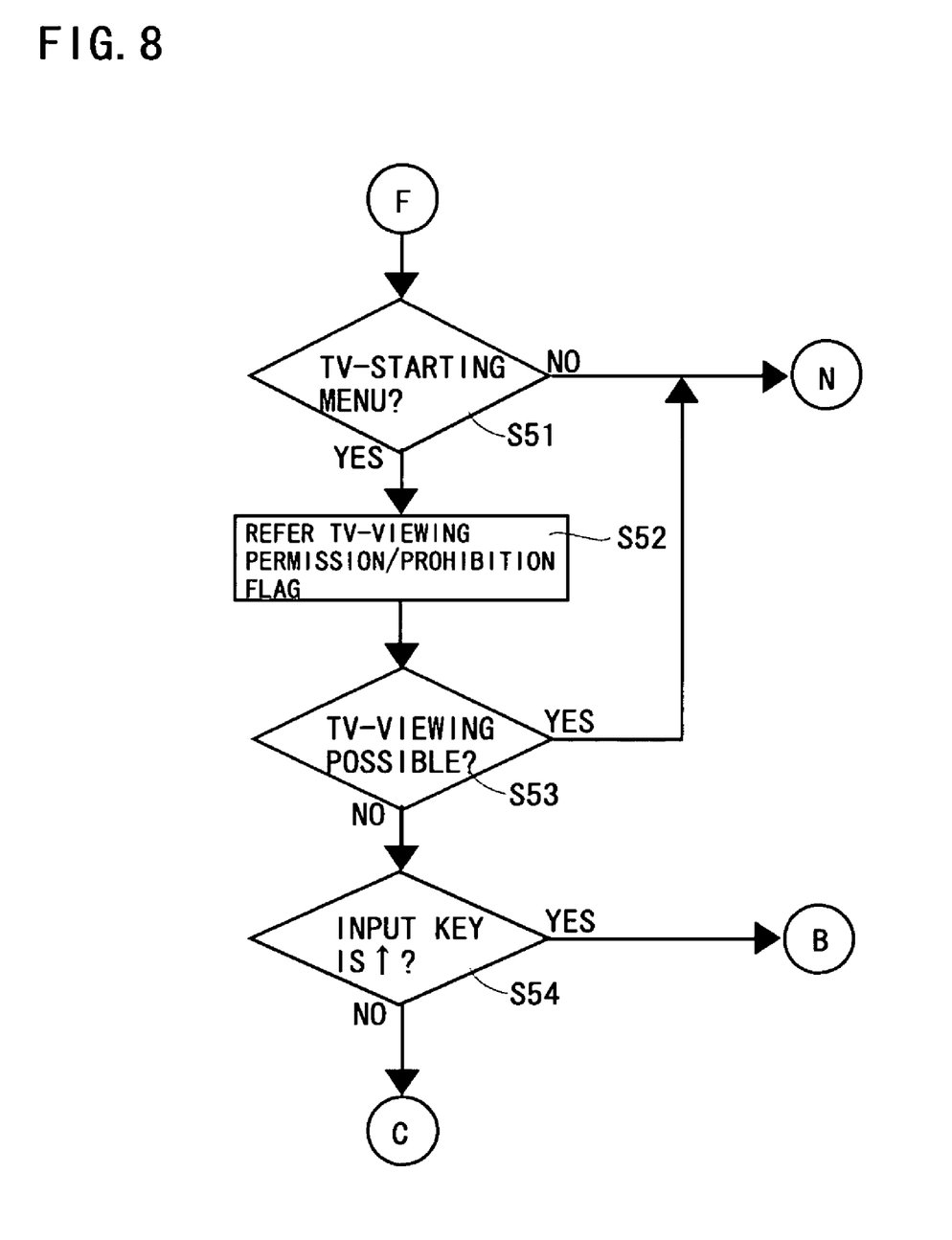
FIG. 8 is a flowchart showing a process content.
Figure 9:
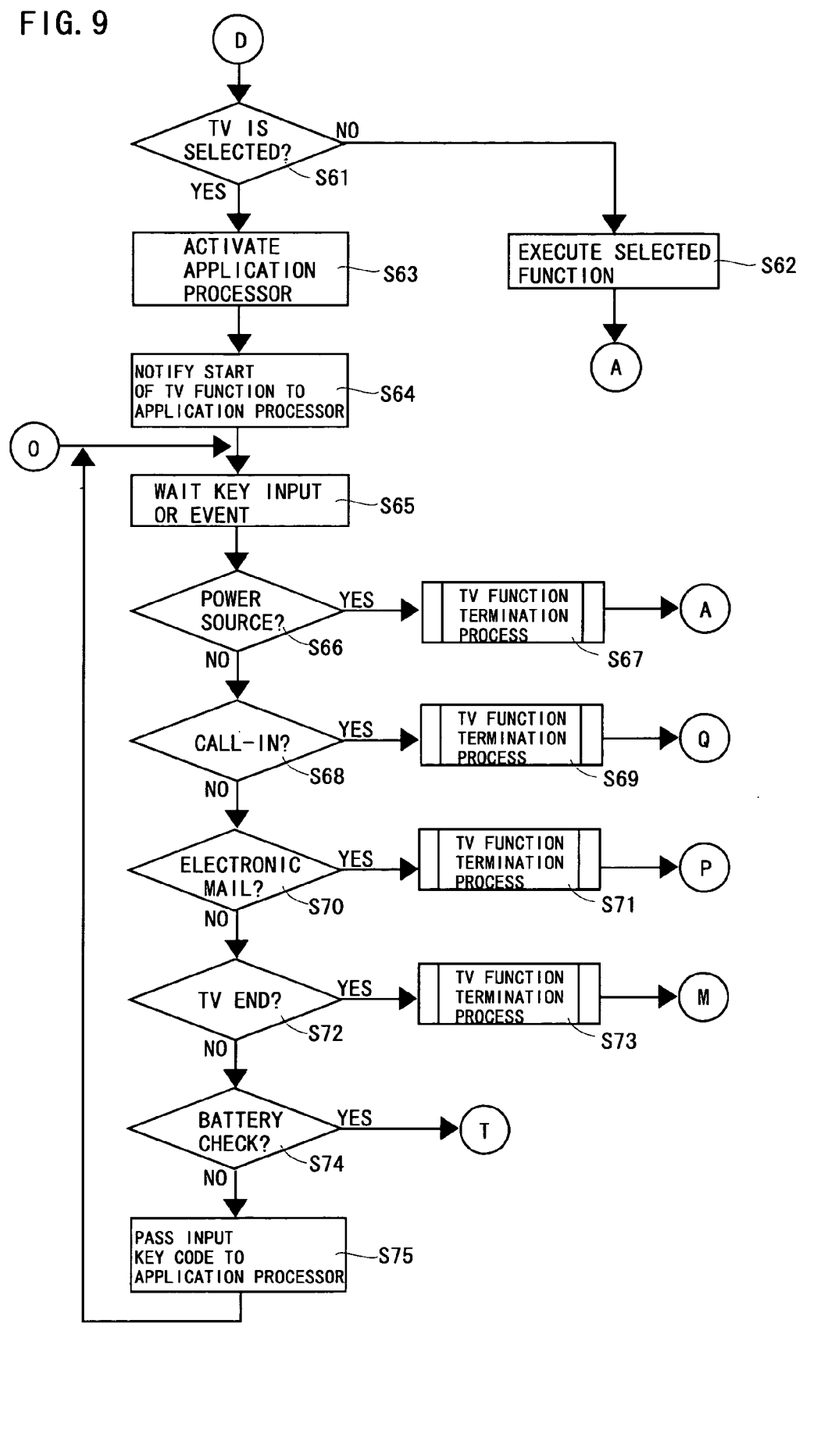
FIG. 9 is a flowchart showing a process content.

Then, it is judged whether or not the position of the cursor is on a TV-starting menu (step S51). That is, in the example of the main menu in FIG. 4, it is judged whether or not the cursor is positioned on the item "5. digital television". If the cursor is not on the TV-starting menu, the process returns to the step S22, and key input or occurrence of an event is waited again. When the cursor is on the TV-starting menu at the step S51, a TV-viewing permission/prohibition flag is referred to (step S52).

Figure 10:
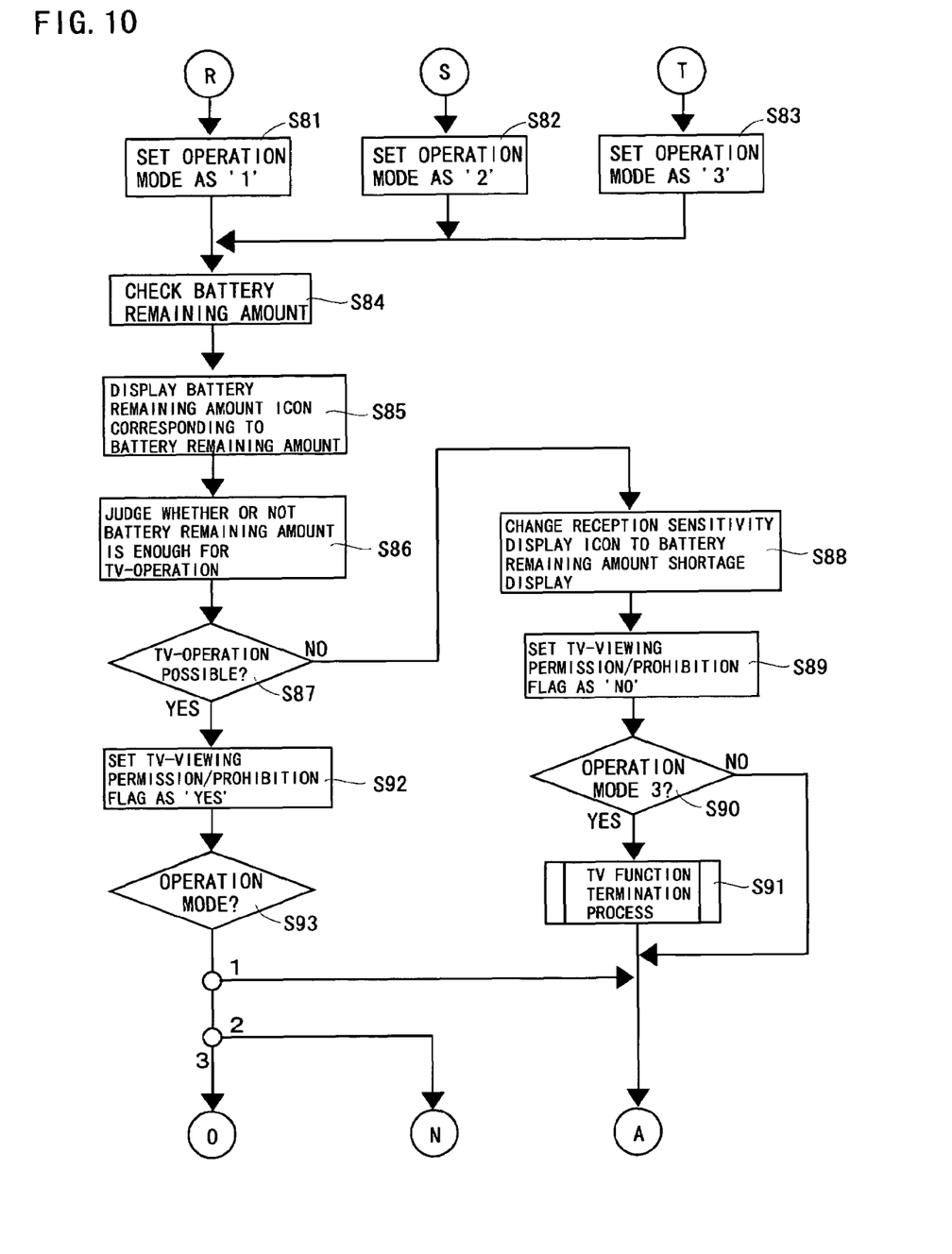
FIG. 10 is a flowchart showing a process content.

The TV-viewing permission/prohibition flag is set as a result of battery remaining amount check performed by the timer activated at the step S2 whenever an event is generated by the timer, and judgment whether or not television-viewing is possible (see FIG. 10). In a case where the TV-viewing permission/prohibition flag indicates that TV-viewing is disabled (NO at the step S53), when the upper-direction cursor-moving key is depressed according to the key code stored at the step S34 or S44 (YES at the step S54), the process proceeds to the step S31, on the other hand, when the lower direction cursor-moving key is depressed (NO at the step S54), the process proceeds to the step S41. Such the process allows the cursor 621 to skip the item "5. digital television" in a state where TV-viewing is impossible due to a shortage of battery remaining amount. When it is judged that TV-viewing is possible at the step S53, the process returns to the step S22 and key input or event occurrence will be waited.

When it is judged that the operated key is not the lower direction cursor-moving key at the step S24, it is judged whether or not the operated key is the OK key (step S25). The OK key indicates a key code generated when the center of the cross key 82 is depressed. When the operated key is the OK key, the menu item on which the cursor is placed is checked whether or not the TV-starting menu (step S61: see FIG. 9). If the menu item is not the TV-starting menu, a function according to each menu item is performed (step S62) and the process returns to the step S3. If the item on which the cursor is placed is the TV-starting menu (YES at the step S61), the application processor 5 is activated at first (step S63), and a start command of TV-viewing function is notified to the application processor 5 (step S64). According to this command, the application processor 5 starts the TV-viewing process. When the application processor 5 starts the TV-viewing process, key input or occurrence of another event will be waited (step S65). Then, it is judged that the event is any one of the depression of the power source key, call-in, arrival of electronic mail, and TV-viewing termination event sent from the application processor 5 (respectively at step S66, step S68, step S70, step S72). If any of the above-described events occurs, the TV-viewing termination process is performed (at step S67, step S69, step S71, or step S73). The TV-viewing termination process includes turning off the power source of the tuner, switching over the application processor 5 to a sleep mode, and the like. When the TV-viewing termination process is completed, the process proceeds to a different step depending on each event. That is, the process proceeds to the step S3 in a case of depression of the power source key (YES at the step S66), to the step S9 in a case of call-in (YES at the step S68), to the step S10 in a case of arrival of electronic mail (YES at the step S70), and to the step S21 in a case of TV-viewing termination (YES at the step S72). When it is judged NO at the step S66, step S68, step S70, and step S72, the CPU checks whether or not the event is a battery check (step S74). If the event is a battery check, the process proceeds to the step S83. If the event is not a battery check, the inputted key code (or the event) is passed on to the application processor 5 (step S75) and the process returns to the S65.

When it is judged that the operated key is not the OK key at the step S25, it is judged whether the operated key is the power source key or the clear key (the step S26), whether or not the event is call-in (the step S27), whether or not the event is arrival of electronic mail (the step S28), respectively. In a case where it is judged YES at each step, when the power source key or the clear key is depressed (YES at the step S26), the process proceeds to the step S3, when the event is call-in (YES at the step S27), the process proceeds to the step S9, and when the event is arrival of electronic mail (YES at the step S28), the process proceeds to the step S10, respectively. In a case where it is judged NO at each step, it is judged whether or not the event is a battery check (step S29). If the event is not a battery check, the process returns to the step S22, and the next key input or occurrence of an event will be waited. If the event is judged to be a battery check (YES at the step S29), the process proceeds to step S82.

FIG. 10 shows the process performed at the time of occurrence of a power source check event. In a case of reaching the process due to occurrence of the power source check event while the standby screen is displayed, an operation mode is stored as "1" (step S81). In a case of reaching the process due to occurrence of the power source check event while the main menu screen is displayed, the operation mode is stored as "2" (step S82). In a case of reaching the process due to occurrence of the power source check event in a state where key input or occurrence of an event is waited after the TV-viewing function has been activated, the operation mode is stored as "3" (step S83). In any case, the remaining amount of the battery 7 is checked by referring to the battery remaining amount monitor 11 (step S84). Then, the battery remaining amount icon 611 suitable for the checked battery remaining amount is selected and displayed (step S85).

Next, it is judged whether or not the battery remaining amount is enough for TV operation (step S86). If it is judged that the TV operation is diabled (NO at step S87), the TV reception state icon 613 is changed to a display indicating a shortage of battery remaining amount (step S88: see FIG. 3D), and the TV-viewing permission/prohibition flag is set as "NO" (step S89). Furthermore, the operation mode is checked. If the operation mode is "3" (YES at step S90), the TV-viewing termination process is performed (step S91) due to a shortage of battery remaining amount during the TV-viewing, the process is returned to the step S3 at which the key input/event occurrence is waited on the standby screen.

If it is judged that the TV-viewing is permitted at the step S87, the TV-viewing permission/prohibition flag is set as "YES" (step S92), the process is returned to the step S3, the step S22, or the step S65 based on the operation mode.

In addition, the above embodiment shows the control process and the change process of the menu and icons based on a battery remaining amount in a case where an additional function is the TV-viewing function. However, in a case where a motion picture reproduction and display function with a recording medium, a digital camera function, a light, wireless LAN function, and the like, are provided as additional functions, the control process and the change process of a menu and icons may be performed on all of or a part of these functions.

What is claimed is:

1. A mobile telephone device provided with an additional function, comprising:
   means for monitoring a battery remaining amount and disabling all of or a part of the additional function upon falling of the battery remaining amount below a certain value; and
   means for changing display modes of a menu for activating the additional function depending on whether the additional function is in a disabled state or in a permitted state, each state being determined based on the battery remaining amount.

2. A mobile telephone device according to claim 1, wherein a cursor moving on items on the menu skips an item of a disabled additional function when the additional function is in the disabled state.

3. A mobile telephone device according to claim 1 or 2, wherein the item of the disabled additional function is not displayed or displayed in pale color when the additional function is in the disabled state.

4. A mobile telephone device according to claim 1 or 2, wherein the battery remaining amount is monitored even while the additional function being executed, and the additional function under execution is forcibly terminated upon falling of the battery remaining amount below the certain value.

5. A mobile telephone device according to claim 1 or 2, wherein the battery remaining amount is monitored regularly.

6. A mobile telephone device provided with a broadcast receiving and viewing function as an additional function, comprising:
   a display portion for displaying an icon representing presence of the broadcast receiving and viewing function or a state of the broadcast receiving and viewing function;
   means for monitoring a battery remaining amount and disabling all or a part of the broadcast receiving and viewing function upon falling of the battery remaining amount below a certain value; and
   means for changing display modes of the icon depending on whether the broadcast receiving and viewing function is in a disabled state or in a permitted state.

7. A mobile telephone device according to claim 6, comprising
   a broadcast receiving and viewing function as the additional function, wherein an icon representing broadcast reception sensitivity is displayed as the icon, and display modes of the icon are changed depending on whether a broadcast receiving and viewing function is in a disabled state or in a permitted state.

* * * * *